March 26, 1963 W. G. CREAVEY 3,083,023
SPRING SEAL
Filed March 2, 1959 2 Sheets-Sheet 1
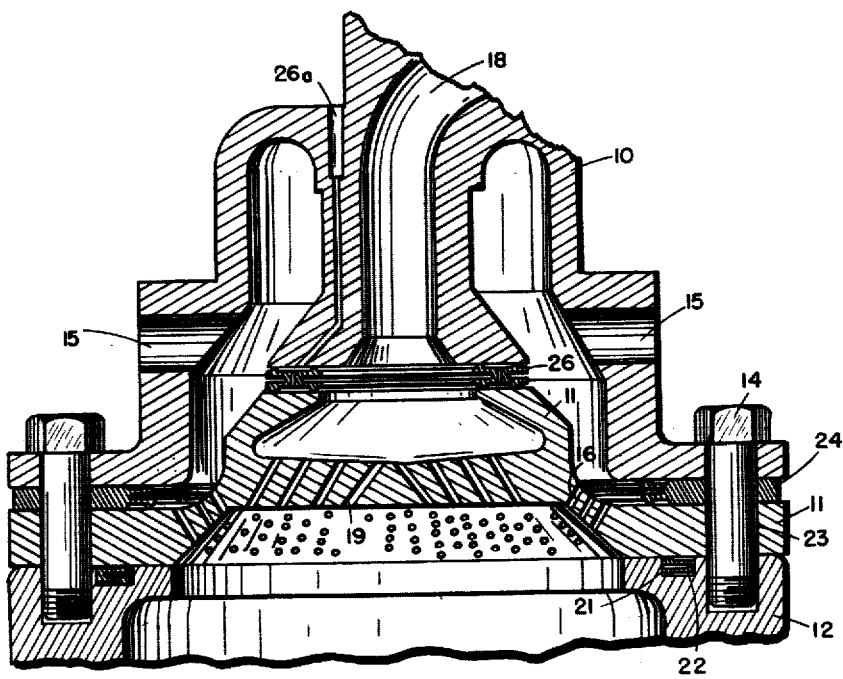
FIG. 1
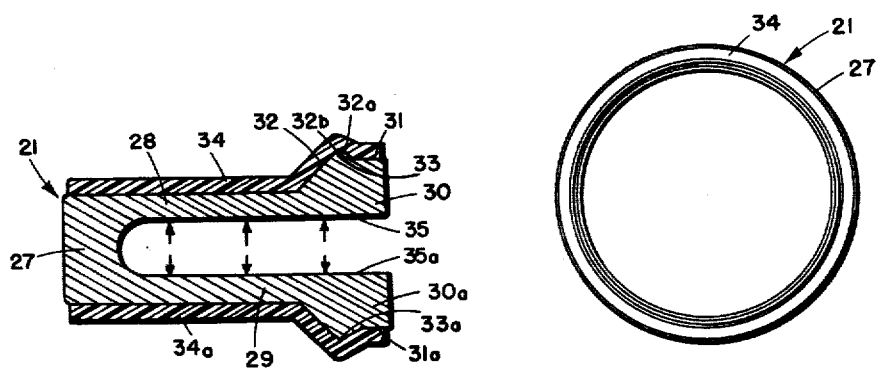
FIG. 2
FIG. 3
INVENTOR.
WILLIAM G. CREAVEY
BY Noel H. Conway
ATTORNEY

United States Patent Office 3,083,023
Patented Mar. 26, 1963

3,083,023
SPRING SEAL
William G. Creavey, Canoga Park, Calif., assignor to
North American Aviation, Inc.
Filed Mar. 2, 1959, Ser. No. 796,327
11 Claims. (Cl. 277—206)

This invention relates to a seal and more particularly to a self-energizing seal.

More specifically this invention relates to a seal which uses the pressure sealed to increase the pressures at the actual sealing surfaces as required.

More particularly this invention relates to a self-energizing seal which uses the pressure sealed to effect a high pressure seal but is also provided with means to prevent the sealing ridge from cutting through a soft coating placed on the seal at the actual sealing portion.

In our modern missiles the requirements of the seals used are becoming more and more rigorous as the range of the environmental temperatures and pressures in which the seal operates increases. Further, any seal which is used must be very light in weight since weight is a premium in aircraft. The self-energizing type seal, that is, a seal which is of such configuration that it uses the pressure sealed to force the actual sealing portion of the seal against the seal seat harder as is needed when the pressure is increased, is very useful for this purpose. However, the prior self-energizing seals which have been provided to this date have several disadvantages. If the seal is designed so that there is metal to metal contact between the actual sealing portion of the seal and the seal seat, the seal is very hard to manufacture since the sealing surfaces must be machined within minute tolerances in order to insure adequate contact. In order to alleviate this tolerance problem, some seals have used a soft elastomeric material between the metal of the seal seat and the metal of the actual seal. However, such structure is not successful over the very wide ranges of pressures and temperatures. One main problem is that there is insufficient pressure between the seal and the seat at the lower pressures when only the spring tension of the seal is used to affect the contact between the respective parts for the seal. A recent improvement in the self-energizing seal art is the idea of providing a ridge or lip projecting from the side walls of the seal in order to affect the seal at these low pressures as shown in Patent Number 2,875,917. This is because the lip reduces the area of sealing contact and thereby increases the effective pressure at the location of sealing contact. However, while such structure works successfully at the lower pressure, it has the disadvantage that at very high pressures the projected lip is forced against the gasket material with such a high pressure that the lip many times cuts throuugh the resilient gasket material. The present invention overcomes this disadvantage by providing means adjacent the sealing edge to prevent this excessive force from causing an overpressure which will cause the sealing ridge to cut through the gasket material. The present invention also includes the idea of mounting a layer of resilient material directly on the sealing member side walls and thereby making the seal much easier to use since there is only one piece to handle. Therefore, the seal also is provided with a configuration that will prevent this layer of resilient material from being scuffed while the seal is being installed. A further feature of the present seal over the prior art is that a shoulder portion is provided at the ring base portion in order to prevent the two members being sealed together from moving too close together and over stressing the spring side walls of the sealing member. In some situations it is desirable to seal two concentrically located chambers from each other in situations where both chambers contain fluids under very high pressure which would ignite or cause some other disastrous effect if they were allowed to come in contact with each other. An embodiment of the present invention will successfully perform this sealing function as will be described below.

Therefore it is an object of this invention to provide a seal.

It is a further object of this invention to provide a self-energizing seal having a layer of resilient material mounted thereon.

A still further object of this invention is to provide a spring seal having a sealing ridge on the side walls and being provided with means to prevent any overpressure from the sealed fluid from causing the sealing ridge to cut through the layer of resilient material provided on the side wall.

It is also an object of this invention to provide a spring seal having a shoulder portion at its ring base portion which prevents the two members being sealed from moving too close together and over stressing the spring seal.

It is a still further object of this invention to provide a spring seal which is capable of sealing two chambers apart and preventing flow from either direction.

Other and further objects of this invention will become apparent in conjunction with the detailed description below wherein:

FIG. 1 discloses a cross-sectional view of an apparatus using the three embodiments of the invention which will be described;

FIG. 2 shows a detail cross-sectional view of a first embodiment of the invention;

FIG. 3 shows a plan view of the first embodiment of the invention;

Figure 4:
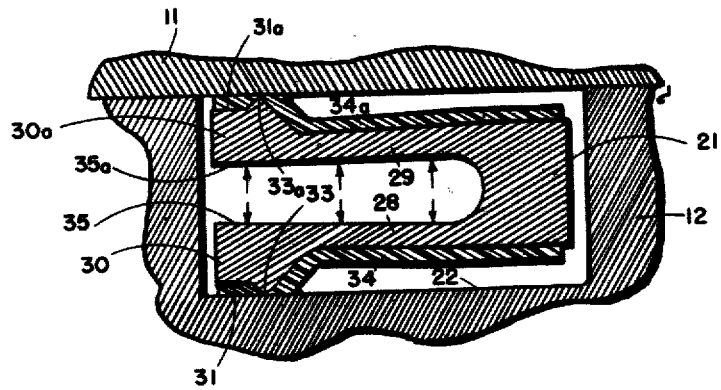
FIG. 4 shows a detail cross sectional view of the first embodiment of the invention in sealing relation.

FIG. 1 shows a partial cross sectional view of an injection apparatus to a combustion power device which has been selected since it illustrates the use of three different embodiments of the present invention which will be more specifically described below. As can be seen a liquid oxygen duct 10 called a LOX post has a generally bell shape with injector plate 11 mounted on its bottom. Injector plate 11 is positioned on combustion chamber 12, the top only of which is shown. These members are held together by a series of bolts 14. As can be seen the fuel comes in through inlets 15 and passes through passages 16 in the injector plate 11 where they are mixed with the LOX exiting from passages 19 leading from inlet 18.

Seal 21 is a first embodiment of the invention and is located in groove 22 in the combustion chamber 12 for sealing the leak passage between the combustion chamber 12 and the injector plate 11. Here the pressure sealed pushes against the inward side of the spring side walls of the seal 21 forcing the sealing ridge against the injector plate 11 and the walls of the combustion chamber 12. The side walls and the resilient layers used with the seals will be discussed in greater detail below. The resilient layers are not clearly shown because the size of this figure will not permit such detail. In this case the groove 22 is of such depth that even when the injector plate 11 is contacting the combustion chamber 12 the spring seal would not be overstressed. In other cases it is desired that the present invention be usable without the formation of a groove such as 22. In such cases a seal having shoulders such as seal 24 either with or without the series of bolt holes 23 in it is used. In this case the pressure of the fuel forces against the inside of the spring side walls of the seal 24 forcing the sealing ridges on the side walls into sealing relation with the LOX post 10 and the injector plate 11. As mentioned above, the manner in which the sealing ridges function will be described in more detail below. In some situations it is desired to separate two high pressure chambers from each other. In this case a seal such as 26 which has two sets of side walls extending from the ring base portion is quite desirable. Vent 26a is provided to insure that there will always be a maximum pressure differential between the inside of the side walls and the outside of the side walls during operation.

FIG. 2 shows a detailed cross sectional view of the seal 21. Seal 21, as well as each of the other seals described herein may be made of aluminum or stainless steel or beryllium-copper or any other suitable material. The seal is comprised of ring base portion 27 having a first continuous side wall 28 and a second continuous side wall 29 extending from it. Each of the side walls is provided with an overpressure relieving portion 30 on the side wall 28 and 30a on side wall 29. The overpressure relieving portion 30 has overpressure receiving surface 31 on the side of the portion 30 which will face the seal seat. Located on the overpressure relieving portion and projecting from the pressure receiving surface 31 is a sealing ridge 33 which extends the peripheral length of the side wall 28 with the overpressure relieving portion 30. This sealing ridge includes two surfaces 32 and 32a extending at substantially right angles to each other and at substantially 45° to the plane of the side wall 28. However, these surfaces 32 and 32a do not intersect at right angles, but rather sealing edge 32b is formed as a curve by machining a partial radius (typically 0.003 in.) at the edge 32b of the ridge 33. Such a radius has been found to be needed for the ridge to seal adequately the lower pressures and yet not cut through the layer 34 at the high pressures. In this and the other embodiments of the seal which are disclosed in this application the sealing ridge is located on the side of the overpressure receiving surface which is closest to the ring base portion. Such configuration has these advantages although the spirit of the invention includes other ridge locations. First, the resilient layer is held between the seal seat and the overpressure receiving surface on the high pressure side of the sealing ridge. Second, in case the pressure sealed becomes greatly in excess of the design pressure and the side walls are bowed, the sealing ridge will not be tilted away from the seal seat. Side wall 29 also has a similar pressure receiving surface 31a and a sealing ridge 33a located on portion 30a. A coating, tape, or pad 34 of a resilient material such as Teflon or Kel-F is preferably located directly on the side wall 28 and covers the pressure receiving surface 31 as well as the sealing ridge 33. A similar coating 34a is similarly located on side wall 29. These resilient coatings are provided to compensate for any tiny irregularities in the particular sealing ridge and sealing seat, and are applied directly to the sealing ring by means such as cement or other suitable means. With the resilient layer directly attached to the sealing ring the present seal is much easier to use than previously provided seals in that there is only one piece for the installer to handle.

The thickness of the resilient layer 34 is of particular importance to the operation of the present invention. As mentioned above, a projected lip on the sealing member has the important advantage that it reduces the seal area so that a high pressure loading can be obtained with the low forces available at low pressure differentials; however, such a lip cuts through any resilient gasket material provided at very high pressure differential. Therefore, in the present invention the pressure receiving surface 31 is provided with the sealing ridge 33 projecting out of it a predetermined distance. The thickness of the resilient layer 34 must be correlated to the distance that the sealing ridge projects from the sealing surface 31 so that the thickness of the layer 34 is greater than the distance that the sealing ridge 33 projects. It has been found that seals with the dimensions shown in Table I work quite satisfactorily at the indicated pressures.

*Table I*

| Max. Press. Sealed, p.s.i. | Wall Thickness, in. | Press. Rec. Surface Width, in. | Projection of Sealing Ridge, in. | Resilient Layer Thickness, in. |
| --- | --- | --- | --- | --- |
| 2,500 | 0.025 | 0.040 | 0.001 | 0.0065 |
| 5,000 | 0.025 | 0.040 | 0.002 | 0.0065 |
| 10,000 | 0.035 | 0.040 | 0.002 | 0.0065 |
| 15,000 | 0.035 | 0.040 | 0.0015 | 0.0065 |

The dimensional relation between the surface 31a, the sealing ridge 33a, and resilient layer 34a on second side wall 29 is the same as above and therefore does not need individual discussion.

FIG. 3 shows a plan view of the seal in FIG. 2 wherein the seal takes on a generally circular shape. The seal may have other plan view shapes such as square or triangular as needed for the particular application.

FIG. 4 shows a detailed cross-sectional view of the seal in FIG. 2 in sealing relation between the injector plate 11 and the combustion chamber 12. As can be seen the depth of the annular groove 22 is such that the side walls 28 and 29 of the seal are slightly compressed in order that a seal may be effected when there is very low pressure differential between the inside and the outside of the apparatus. The FIG. 4 represents a seal as it would look in sealing a very high pressure and the pressure forces indicated by the arrows on the inner faces 35 and 35a force the sealing ridges 33 and 33a toward the seal seats on the injector plate 11 and the combustion chamber 12. As can be seen the sealing ridges 33 and 33a are penetrating into the resilient material layers 34 and 34a due to the force of the sealed pressure. However, as each of the side walls is moved toward the particular seal seat, the seal seat spreads the particular layer of resilient material and forces it into the area abutting the pressure receiving surfaces 31 and 31a. It should be noted that surfaces 31 and 31a are substantially parallel to the seal seat means in order to work satisfactorily. This action plus the fact that the resilient layer is thicker than the height of the sealing ridge distributes the forces over the wider area surfaces 31 and 31a at the higher pressures thereby preventing the sealing ridges 33 and 33a from cutting through the resilient layers 34 and 34a, respectively.

It will be noted that the side walls 28 and 29 each lie in a plane extending from the ring base portion 27 with the overpressure relieving portions 30 and 30a and surfaces 31 and 31a displaced out of the respective planes towards the respective seal seat. Such structure is preferred in order that only the portions of the resilient layers covering the sealing ridges and overpressure receiving surfaces, and not the entire face of the particular side wall, engage the seal seat. These side walls generally project from the ring base portion from 0.250 to 0.500 inch depending on the particular application. At the lower pressures, if the resilient material, which covers most of each of the side walls in the preferred embodiments, engaged the seal seat the force of the sealed gases would be spread over too large an area to effect a perfect seal. Such structure also permits the use of larger tolerances in the manufacture of the side walls of the seal. More specifically, as indicated above and as will be pointed out below the sealing ridge only projects from 0.002 to 0.004 inch from the overpressure receiving surface and this amount that the sealing ridge projects from the rest of the seal toward the seal seat is quite critical. With the seal structure shown, this critical dimensional relationship must be maintained only on the overpressure receiving surface which is 0.040 inch wide and not on the rest of the side wall. Such structure is especially desired where the side walls have a curved rather than a straight cross-sectional shape. Therefore, it is preferable to have the overpressure receiving surface displaced from the side wall toward the seal seat, in a direction at a right angle to the direction that the particular portion of the side wall projects, a distance which is greater than the thickness of the resilient layer at that portion of the side wall. Further, such structure eliminates undue scuffing of the resilient layers covering the side walls while the seal is being positioned on to the seal seats.

Figure 5:
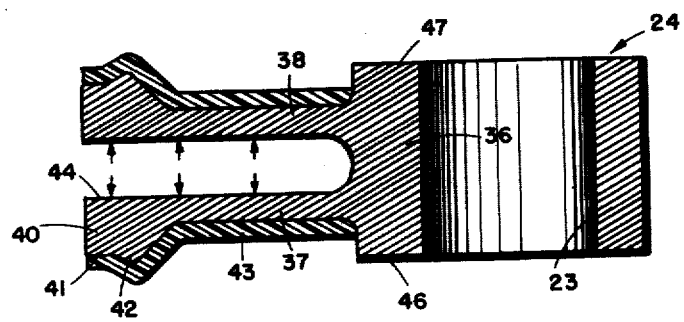
FIG. 5 shows a detail cross sectional view of the second embodiment of the invention having shoulders to prevent the spring side walls of the seal from being overstressed.

FIG. 5 shows a detailed cross sectional view of the seal 24 which is provided with the two side walls 37 and 38 projecting out of the ring base portion 36. As with the first embodiment each of the side walls is provided with means to prevent the sealing ridge from cutting through the resilient layer covering the actual sealing portion. Referring specifically to side wall 37 it is seen that overpressure relieving portion 40 is located on the side wall 37 spaced from the ring base portion and has an overpressure receiving surface 41 facing away from the other side wall 38. Similar to the first embodiment a sealing ridge 42 is provided extending the length of the side wall and projecting out from the overpressure receiving surface 41 which also extends the length of the side wall, a distance which is less than the thickness of the resilient coating 43. As indicated by the arrows the high pressure sealed will provide a force against the inner face 44 in the same manner as the first embodiment. This seal differs from the first embodiment in that the ring base portion is provided with the shoulders 46 and 47 as well as the series of bolt holes or bores 23 which are provided to receive the bolts 14. This seal is to be used in sealing two members together without the use of an annular groove such as 22. Therefore, shoulders 46 and 47 are provided spaced apart a predetermined distance such that when the two members which are to be sealed together, such as LOX post 10 and the injector plate 11, are pulled together the side walls 37 and 38 will not be forced too close together. It has been found that if the shoulders 46 and 47 are spaced apart a distance substantially equal to the distance between the respective overpressure receiving surfaces, the seal will work satisfactorily.

Figure 6:
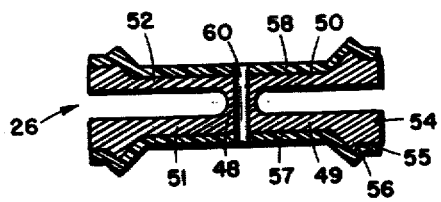
FIG. 6 shows a detail cross sectional view of the third embodiment of the invention which will prevent the flow of leakage in two directions.

FIG. 6 shows a detailed cross-sectional view of the seal 26 which is used to seal two high pressure chambers from each other. Here a ring base portion 48 is provided with first and second side walls 49 and 50 respectively extending outwardly from the ring base portion. Extending inwardly from the center of the sealing ring are third and fourth side walls 51 and 52, respectively. As can be seen each of the side walls is provided with an overpressure relieving portion and sealing ridge as in the other modifications and therefore only side wall 49 will be described in detail. As in the first two embodiments this wall is provided with the overpressure relieving portion 54 extending the length of the side wall and spaced from the ring base portion 48. This overpressure relieving portion 54 is provided with an overpressure receiving surface 55 displaced from the plane of the side wall 49 and has the sealing ridge 56 which extends the length of the side wall projecting from the surface 55. As in the previously described embodiments the sealing ridge 56 projects from the surface 55 a distance which is less than the thickness of the resilient layer 57 which is attached to the outside of the side walls 49 and 51. A similar resilient layer 58 is provided attached to the outer side of the side walls 50 and 52. As can be seen the side walls 49 and 51 lie in the same plane while the side walls 50 and 52 lie in a parallel plane spaced from the first plane. Further, the sealing ridge and pressure receiving surface of the overpressure relieving portion on each of these side walls project out from the plane in which the particular side wall is located. As explained above such configuration minimizes the scuffing of the resilient layer which is attached to the sealing ring in order to compensate for any irregularities in the seal seat or sealing ridge. A series of bores 60 are provided through the ring base portion 48 to equalize the pressure on the outer sides of the seal.

Although the invention has been described and illustrated in detail it is to be clearly understood that the same is by way of illustration and example only and is not taken by way of limitation, the spirit and scope of this invention being limited only by the terms of the appended claims.

I claim:

1. A sealing ring comprising a channel member having a ring base portion with a spring side wall extending from said base portion, a sealing ridge projecting from said side wall, a layer of relatively softer resilient material disposed over said sealing ridge as an integral portion of said sealing ring, means on said channel member displaced from the plane of said spring side wall for preventing the sealing ridge from cutting through the resilient layer when the seal is sealing high pressures.

2. A sealing ring comprising a channel member having a ring base portion with two spring side walls extending substantially unidirectionally from said base portion, a single sealing ridge projecting from an outer side of each said side wall, said sealing ring being of the self-energizing type which uses the pressure sealed to flex the side walls and therefore the sealing ridges toward seal seats, a layer of relatively softer resilient material intimately disposed over each said sealing ridge, means on said channel member displaced from the planes of said side walls for distributing the force of the sealed pressures over a larger area of the seal in order to prevent the sealing ridges from cutting through the resilient material when the seal is in sealing relation.

3. A seal comprising an annular member having a continuous ring base portion, a first continuous flexible side wall extending from said ring base portion, said side wall having an overpressure relieving portion annularly and circumferentially extending about said side wall and being spaced away from said base portion, a resilient coating on said side wall of predetermined thickness, said overpressure relieving portion having an overpressure receiving surface displaced from the plane of the respective side wall, and a sealing ridge having a sealing edge projecting out from each of said overpressure receiving surfaces a distance which is less than the thickness of the coating, said sealing edge being rounded in cross section at its outer extremity.

4. A seal as set forth in claim 3 and wherein the ring base portion has a first and a second shoulder extending its peripheral length, said shoulders being spaced apart approximately the same distance as said overpressure receiving surfaces, said side walls including portions intermediate said overpressure relieving portions and said shoulders, said side wall portions having outer surfaces spaced apart a distance less than that of said shoulders.

5. A seal comprising a channel member having a continuous ring base portion with a spring side wall extending inwardly and a side wall extending outwardly from said ring base portion, each of said side walls having an overpressure relieving surface extending the peripheral length of the side wall and being displaced outward from said ring base portion, a single sealing ridge extending the peripheral length of and projecting from each of said overpressure relieving surface, a layer of resilient material located abutting each of said relieving surfaces and sealing ridges, said sealing ridges projecting from said overpressure relieving portions a distance which is less than the thickness of said resilient material.

6. A seal comprising a continuous channel member having a ring base portion with two spring side walls extending inwardly and two spring side walls extending outwardly from said ring base portion, each of said side walls having an overpressure relieving portion extending the length of the side wall and being displaced from said base portion, an overpressure receiving surface extending the peripheral length of each of said overpressure relieving portions, a sealing ridge projecting from each of said overpressure receiving surfaces, and a layer of resilient material located on each of said relieving portions and sealing ridges, said sealing ridges each projecting from said overpressure receiving surfaces a distance which is less than the thickness of said resilient material.

7. A seal comprising a channel member having a first and a second continuous side wall extending from a continuous base portion, predetermined portions of each of the side walls extending in predetermined directions, each of said walls having a continuous overpressure relieving portion extending the peripheral length of the particular side wall and being spaced away from said base portion, a resilient coating on each of said side walls of predetermined thickness, each of said overpressure relieving portions having an overpressure receiving surface displaced from said predetermined portions of the respective side wall a predetermined distance at a right angle to the respective predetermined directions of the respective predetermined portions, said distance being greater than the thickness of the respective coating at that portion, and a sealing ridge projecting out from each of said overpressure receiving surfaces a distance which is less than the thickness of the respective coating, said sealing ridge being located on the side of the overpressure receiving surface closest to said ring base portion.

8. A seal comprising a resilient channel member having a first and a second continuous side wall extending from a ring base portion, each of said side walls generating a plane, each of said side walls having an overpressure relieving portion extending the peripheral length of the side wall and being spaced away from said base portion, a coating on each of said overpressure relieving portions of predetermined thickness, said coatings being more resilient than the channel member, each of said overpressure relieving portions having an overpressure receiving surface displaced from the plane of the respective side wall a distance greater than the thickness of the respective coating on that side wall, a sealing ridge projecting out from each of said overpressure receiving surfaces a distance which is less than the thickness of the respective coating.

9. The means to seal a leak passage between a first and a second separate space comprising a channel sealing member of substantially constant cross section having a first and a second continuous spring side wall and having a length substantially co-extensive with said passage, said side walls each having an inner and an outer face, a first and a second seal seat means in spaced relation and adjacent the side walls of said channel member, a first resilient material in continuous contact with said first side wall of said channel member, and a second resilient material in continuous contact with said second side wall of said channel member, each of the walls of said channel member being provided with an overpressure relieving portion which has an overpressure receiving surface displaced from the plane of the respective side wall, each of said overpressure receiving surface being substantially parallel to the seal seat means opposite it, and a sealing ridge projecting from said overpressure receiving surface a distance which is less than the thickness of said resilient material at that portion of the channel member.

10. The means to seal a leak passage between a first and a second separate space comprising a channel sealing member of substantially constant cross section having a first and a second continuous spring side wall and having a length substantially co-extensive with said passage, said side walls each having an inner and an outer face, a first and a second seal seat means in spaced relation and adjacent the side walls of said channel member, a first layer of resilient material in continuous contact with a face of said first side wall of said channel member, and a second layer of resilient material in continuous contact with a face of said second side wall of said channel member, each of the side walls of said channel member being provided with an overpressure relieving portion which has an overpressure receiving surface displaced from the respective side wall a distance greater than said layer whereby said layers contact the respective seal seat means only at said overpressure relieving portions, a sealing ridge projecting from said overpressure receiving surface a distance which is less than the thickness of the coating at that portion of the channel member, said sealing ridge being located at the side of said overpressure receiving surface which is closest to said ring base portion.

11. A sealing ring comprising a continuous channel member having a ring base portion, at least one side wall extending inwardly from said base portion, a sealing ridge projecting outwardly from and extending the peripheral length of said side wall and located nearer a free end of said side wall than said base, a layer of relatively soft resilient material disposed upon said sealing ridge, an overpressure receiving surface displaced outwardly from said side wall adjacent said sealing ridge, said resilient material having a thickness less than the displacement distance of said receiving surface and greater than the difference in heights from said side wall of said sealing ridge and said receiving surface.

References Cited in the file of this patent

UNITED STATES PATENTS

| 1,331,216 | Schneider | Feb. 17, 1920 |
| 2,269,486 | Santoro | Jan. 13, 1942 |
| 2,330,425 | Hilton | Sept. 28, 1943 |
| 2,774,621 | Kilbourne | Dec. 18, 1956 |

FOREIGN PATENTS

| 264,524 | Great Britain | Feb. 2, 1928 |
| 1,132,266 | France | Oct. 29, 1956 |
| 130,627 | Great Britain | Aug. 14, 1919 |

UNITED STATES PATENT OFFICE
CERTIFICATE OF CORRECTION

Patent No. 3,083,023            March 26, 1963

William G. Creavey

It is hereby certified that error appears in the above numbered patent requiring correction and that the said Letters Patent should read as corrected below.

Column 6, line 56, for "a channel" read -- a continuous channel --.

Signed and sealed this 7th day of April 1964.

(SEAL)
Attest:

ERNEST W. SWIDER
Attesting Officer

EDWARD J. BRENNER

Commissioner of Patents